Oct. 27, 1959  W. E. GLENN  2,910,545
TRANSDUCER
Filed Aug. 30, 1954
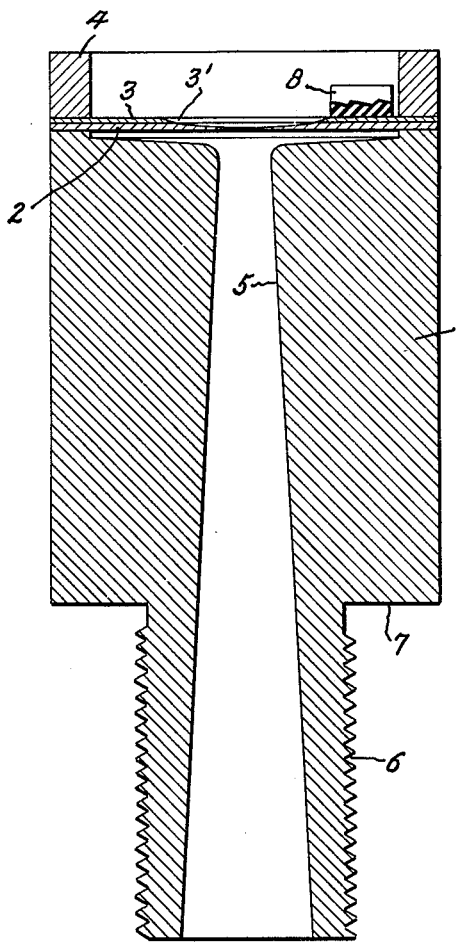
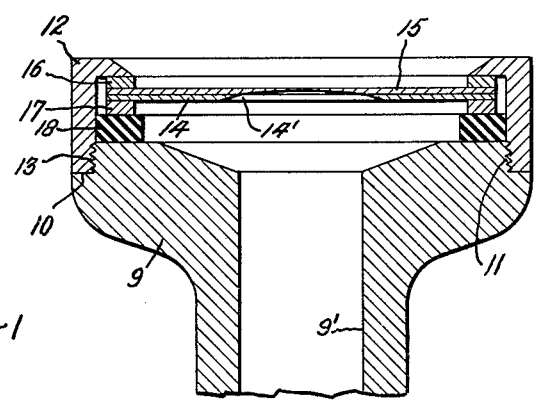
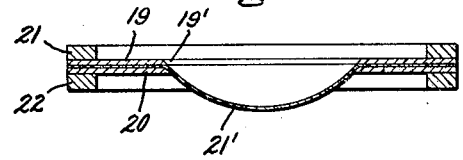
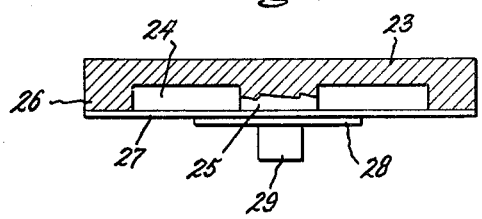
*Inventor:*
*William E. Glenn,*
*by Paul A. Frank*
*His Attorney.*

United States Patent Office 2,910,545
Patented Oct. 27, 1959

2,910,545

TRANSDUCER

William E. Glenn, Schenectady, N.Y., assignor to General Electric Company, a corporation of New York Application August 30, 1954, Serial No. 452,834

7 Claims. (Cl. 179—110)

My invention relates to transducers and more particularly to electromechanical transducers suitable for use as microphones and loudspeakers.

Piezoelectric materials which generate a voltage across one dimension thereof in response to compressive and tensile stresses applied in the direction of this dimension are well known. One such material, for example, is polycrystalline barium titanate ($BaTiO_3$). This material is a mechanically workable ceramic which, when polarized by the application of an electric field thereto, produces an alternating voltage signal when a mechanical stress is cyclically applied in the direction of polarization. It is well known to use these materials in transducers and, in such applications, a diaphragm is employed to apply the mechanical stress to the piezoelectric material in accordance with sound waves vibrating the diaphragm. One method for effecting this coupling of energy between the diaphragm and the piezoelectric member has been to provide a ring-shaped piezoelectric member across which is provided a diaphragm. When such an arrangement is utilized in a loudspeaker, for example, contraction and expansion of the piezoelectric ring causes vibration of the diaphragm. In other arrangements, a diaphragm is provided in peripheral contact with a ceramic disk which is fixedly secured to a relatively stationary member. Consequently, variations in the thickness of the ceramic are transferred to the diaphragm and by a mechanical multiplying arrangement, amplification of ths movement is effected.

An object of my invention is to provide a new and improved transducer employing a piezoelectric member.

Another object of my invention is to provide a new and improved transducer having a relatively flat response characteristic throughout a wide range.

A further object of my invention is to provide a transducer which may be employed in amplifiers as well as loudspeakers.

A still further object of my invention is to provide a new and improved transducer wherein a relatively simple mode of deflection is utilized to vary the thickness of the crystal element.

In accordance with the teachings of my invention, an annularly shaped piezoelectric element, such as, for example, barium titanate, is metallized on the two flat surfaces thereof and has bonded thereto a diaphragm which extends across the central aperture of the annular member. The diaphragm and piezoelectric element are bonded throughout the juxtaposed surfaces, i.e., in face-to-face relationship, for example, by gluing. The composite member is supported by a pair of electrodes at the periphery thereof such that sound waves causing a vibration of the diaphragm result in a bending of the piezoelectric element.

For further objects and advantages and for a better understanding of my invention, attention is now directed to the following description and accompanying drawings and also to the appended claims wherein those features of novelty which characterize my invention are pointed out with particularity.

In the drawing, Fig. 1 is a longitudinal central sectional view of a portion of a loudspeaker embodying my invention; Figs. 2, 3, and 4 are longitudinal central sectional views of other embodiments of my invention.

Fig. 1 illustrates, in section, a loudspeaker suitable for operation at the higher audio frequencies and which is usually referred to as a tweeter. The loudspeaker generally includes a throat-defining member 1 across the throat of which is fastened a thin circular diaphragm 2. A disk 3 of piezoelectric material having a central aperture 3' is positioned face to face in abutting relationship with diaphragm 2. An annular electrode 4 having an outer diameter substantially equal to the diameters of the diaphragm and piezoelectric disk and an inner diameter substantially larger than the diameter of aperture 3' is fastened to disk 3. In this particular embodiment, it is desirable that throat 1 and diaphragm 2, and disk 3 and electrode 4, respectively, be bonded together. It will be understood, however, that any type of suitable mechanical clamping arrangement may be employed without destroying the operativeness of any invention as therein embodied.

The throat-defining portion of member 1 consists of a frustoconical aperture 5 having a minimum cross-sectional area in the immediate vicinity of diaphragm 2. The opposite end of throat-defining member 1 is provided with an external threaded portion 6 and a shoulder 7. The horn of the loudspeaker (not shown) is threadedly attached to the throat and abuts against shoulder 7. A damping pad 8, conveniently constructed of rubber, is supported by the crystal member to damp the fundamental resonance of the diaphragm which in its particular embodiment is chosen to be 20 kilocycles (the highest audio frequency).

In this embodiment, throat-defining member 1 is also an electrode and is consequently constructed of a good electron conducting material, such as, for example, aluminum. Of course, other means may be provided for coupling electric energy across the crystal. Utilizing the throat-defining member as the electrode, however, simplifies the construction and reduces the cost.

Crystal 3 is a flat disk of piezoelectric material having a central aperture provided therein. Diaphragm 2 which is likewise a disk is bonded to crystal 3 throughout the abutting areas. Crystal 3 has provided on the opposite surfaces thereof a metallic coating and, in this embodiment, it is necessary that the diaphragm be made of an electron conducting material. In one commercial embodiment, crystal 3 comprises a barium titanate disk on the opposite surfaces of which is provided a thin layer of silver, and the diaphragm is a thin disk of aluminum alloy.

The crystal and diaphragm arrangement may conveniently be fabricated by bonding a thin flat disk of barium titanate to a similar disk of aluminum alloy. The central portion of the composition disk is then ground down to provide a concave surface extending from the crystal side of the disk into the metal. In this way, the desired aperture is provided in the crystal and the central dimension of the diaphragm may be accurately established.

In operation, a polarizing field may be established within piezoelectric disk 3 in the direction of the thickness thereof by the application of a direct potential between electrode 4 and member 1. As is known in the art, either a polarizing field must be used or, for example, when the piezoelectric material employed is barium titanate, it may be permanently polarized before fabrication of the unit. As is also known in the art, when an alternating electric field is superimposed on the polarizing field, the thickness of the piezoelectric material varies at the frequency of the alternating field. In a device, such as, for example, the loudspeaker of Fig. 1, when the thickness of the piezoelectric member changes the member tends to expand in the plane of the diaphragm, thereby resulting in bending of the piezoelectric disk and diaphragm since the diaphragm is bonded to the disk. The deflection of the diaphragm ranges from a maximum at the center to a minimum at the supported periphery. Therefore, amplification of the movement of the disk results.

When a similar diaphragm and piezoelectric composite unit are employed in a microphone wherein the diaphragm is caused to move as by sound waves in the direction of the piezoelectric disk, the thickness of the disk is thereby increased; whereas, when the sound waves cause a movement in the other direction, the thickness of the disk is decreased. The piezoelectric element is, therefore, subjected to a bending stress which in turn provides the compressive stress which generates the voltage between the metallized surfaces of the disk.

In Fig. 2, there is illustrated a preferred embodiment of my invention wherein the crystal and associated diaphragm are utilized in a microphone. In this microphone, a base member 9 having a central aperture 9' is provided with a shoulder 10 and an externally threaded portion 11. An annular member 12, L-shaped in cross section, is provided with an internal threaded portion 13 which mates with threaded portion 11 of member 9. A composite disk comprising a piezoelectric member 14 having a central aperture 14' and a metallic diaphragm 15 are sandwiched between a pair of annular electrodes 16 and 17. An annular cushion 18, such as, for example, rubber, is provided between member 9 and electrode 17, and the combination of electrodes 16 and 17, cushion 18, and the composite disk are mechanically clamped together by member 12.

In the embodiment of Fig. 3 which may be employed in either a microphone or loudspeaker, only the relatively narrow rim of the diaphragm is employed to effect a bending stress of the piezoelectric member. In this embodiment, a piezoelectric disk 19 having a central aperture 19' provided therein and a diaphragm 20 are bonded together and sandwiched between a pair of annularly shaped electrodes 21 and 22. Diaphragm 20 has a partially spherical-shaped central portion 21' located opposite aperture 19'. With this arrangement, the central portion of the diaphragm is not subjected to a bending stress such that a maximum deflection thereof may be effected.

Fig. 4 illustrates another embodiment of my invention wherein the bending stress is applied to the crystal disk. In this embodiment there is provided an electrode 23 having annular recess 24 defining a centrally located button 25 and peripheral annular shoulder 26. A metallic, disk-shaped diaphragm 27 is provided across electrode 23 in contact with shoulder 26 and button 25. A thin disk of piezoelectric material 28 having a diameter larger than the diameter of button 25 but considerably less than the diameter of the diaphragm is bonded throughout the entire area thereof to the diaphragm. Disk 28 is provided with a metallic layer on the opposite surfaces thereof and an electrode 29 is fastened to disk 28 opposite button 25. As is readily apparent from an examination of the drawing, mechanical vibration of diaphragm 27 causes the application of a bending stress to piezoelectric disk 28, thereby effecting an electric signal between electrodes 23 and 29.

While my invention has been described by a particular embodiment thereof, it will be understood that those skilled in the art may make many changes and modifications. Therefore, by the appended claims, I intend to cover all such changes and modifications which fall within the true spirit and scope of my invention.

What I claim as new and desire to secure by Letters Patent of the United States is:

1. In a transducer the combination comprising a thin disk of piezoelectric material having a substantially flat surface of extended area and a thin circular diaphragm bonded in face-to-face relationship to said disk throughout substantially the entire area of said flat surface, said disk being shaped to cover less than the total area of said diaphragm and means engaging said diaphragm at a point remote from the uncovered area thereof to restrain said disk and diaphragm from movement to provide mechanical coupling between motion of said diaphragm in a direction normal to the plane of the diaphragm and movement of said disk in the plane of said disk.

2. In a electroacoustic translating device the combination comprising a thin piezoelectric disk having an aperture therein and a substantially flat surface of extended area surrounding said aperture and a diaphragm fastened to said disk throughout substantially the entire area of said flat surface and extending across said aperture.

3. In a transducer the combination comprising a thin piezoelectric disk having a central aperture and an extended substantially flat surface surrounding the aperture, and a disk of electron conductive material abutting face to face said piezoelectric disk, and means bonding together said disks throughout substantially the entire area of said substantially flat surface.

4. In a electroacoustic translating device the combination comprising a thin annular piezoelectric member having a plane face and a diaphragm having a planar annular portion bonded to the plane face of said piezoelectric member throughout substantially the entire area of said plane face and a portion extending over the opening in said annular piezoelectric member and subjected to a force in a direction normal to the planar portion of the diaphragm when said piezoelectric member moves in the direction of the plane of said member and subjects said piezoelectric member to a force in the direction of the plane of said member when said diaphragm moves in a direction normal to the planar portion thereof.

5. In an electroacoustic device, a substantially flat piezoelectric member having a concave surface and a flat surface and a diaphragm having a flat surface bonded to said piezoelectric member throughout substantially the entire area of said flat surface of said piezoelectric member.

6. In a electroacoustic translating device the combination comprising an annular piezoelectric member having a non-planar surface and an opposing planar surface and a diaphragm bonded to said member throughout the entire area of said planar surface.

7. In a transducer, the combination of a piezoelectric disk provided with a central aperture, a thin disk having a central aperture abutting said piezoelectric disk and bonded thereto substantially throughout the abutting area, a partially spherical-shaped diaphragm fastened to said thin disk across the aperture thereof, and means supporting said disks at the peripheries thereof.

References Cited in the file of this patent

UNITED STATES PATENTS

| | | |
|---|---|---|
| 2,177,629 | Foster | Oct. 31, 1939 |
| 2,305,369 | Williams | Dec. 15, 1942 |
| 2,416,887 | Tibbetts | Mar. 4, 1947 |
| 2,556,558 | Silverman | June 12, 1951 |
| 2,589,403 | Kurie | Mar. 18, 1952 |
| 2,607,858 | Mason | Aug. 19, 1952 |

FOREIGN PATENTS

| | | |
|---|---|---|
| 468,514 | Germany | Jan. 14, 1926 |